Figure 1:
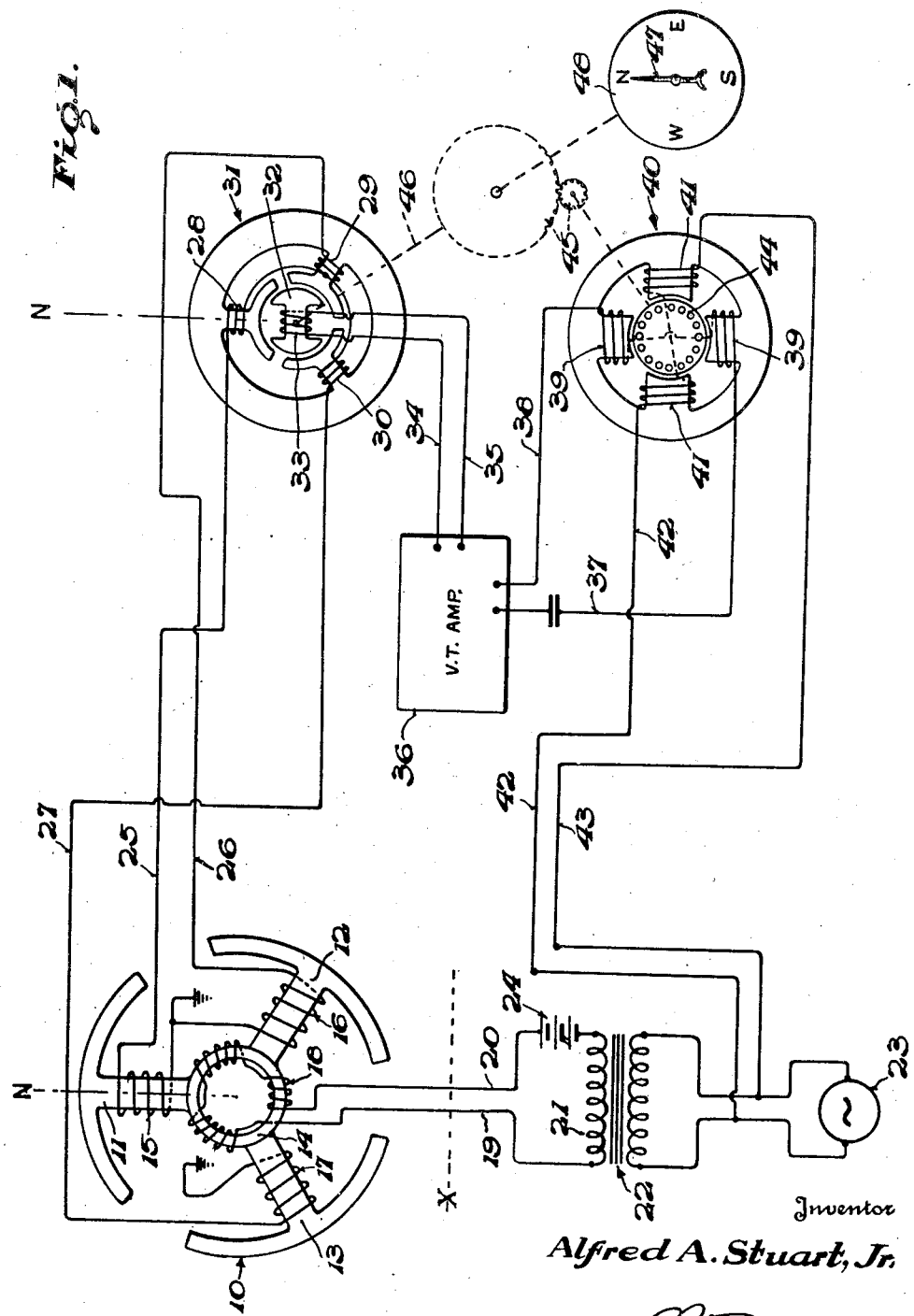

April 13, 1948.　　　A. A. STUART, JR　　　2,439,701
INDUCTION SYSTEM
Filed Sept. 2, 1944　　　2 Sheets-Sheet 1

Inventor
Alfred A. Stuart, Jr.
By
Attorney

Inventor
Alfred A. Stuart, Jr.

Patented Apr. 13, 1948

2,439,701

UNITED STATES PATENT OFFICE 2,439,701

INDUCTION SYSTEM

Alfred A. Stuart, Jr., Hasbrouck Heights, N. J., assignor to Bendix Aviation Corporation, Teterboro, N. J., a corporation of Delaware Application September 2, 1944, Serial No. 552,475

8 Claims. (Cl. 33—204)

The present invention relates to magnetic compasses of the earth inductor type of the character shown and described in copending application Serial No. 464,095 filed October 31, 1942, now Patent 2,361,433, granted Oct. 31, 1944, of which the present application constitutes a continuation in part.

The inductor element of the system of the aforementioned application, which may be suspended in the earth's magnetic field or in any unidirectional magnetic field resulting from means other than the earth's field, comprises a permeable member having three symmetrically disposed legs and provided with a single phase energizing winding thereon connected to a source of alternating current and three-phase wound secondary windings whose output frequency is twice the frequency of the exciting current, the secondary windings being connected to an inductive device having a three phase wound stator and an inductively coupled rotor carrying a winding thereon which may be connected directly to the alternating current source or to the variable phase of a two phase induction motor whose fixed phase is connected to the alternating current source. Such systems, because of the double frequency output at the secondary windings, in order to operate properly, require the interposition of a frequency doubler between the alternating current source and the rotor winding or between the source and the fixed phase of the motor depending upon which of the two systems is used.

It has been discovered, however, that in utilizing alternating current for energizing the primary winding certain undesirable limitations are encountered whereby the available power output thereof is definitely limited. The principal reason for this limitation appears to be that the characteristics of the permeable core member are such that beyond a frequency of 1400 cycles, for example, of the energizing current, the power output attains a maximum and, thereafter, any increase in the frequency of the energizing current results in a gradual decrease in the power output.

The aforementioned undesirable limitation has been overcome by the present invention by making provision for energizing the primary winding with undulating current whereby the frequency of the output of the secondary windings will be of the same frequency as that of the alternating current source from which the undulating current is obtained, the source being connected directly with the rotor of the inductive device or the fixed phase of the driving motor, depending upon which of the two arrangements is utilized. With this novel arrangement the necessity for the frequency doubler has been overcome and even though the elimination of the doubler is an important advantage it is secondary only to the primary advantage obtained which is a substantially increased power output. Laboratory tests, for example, have shown that by energizing the primary winding with undulating current, the power output at the secondaries increased in substantially a straight line function with increasing frequency of the energizing current up to a frequency of some 25,000 cycles.

An object of the present invention, therefore, is to provide a novel system of the character discussed having an inductor element adapted for operation in the earth's magnetic field or in any unidirectional magnetic field selected, whose power output will be substantially increased over related prior art systems.

Another object of the invention is to provide a novel system of the character described having an inductor element adapted for operation in the earth's magnetic field or in any unidirectional magnetic field selected, wherein the primary or energizing winding of the element is fed with undulating current so that a great reduction of hysteresis in the permeable material of the core of the inductor is obtained thereby permitting the use of very much higher excitation frequencies by virtue of which a much higher power output is obtained from the inductor.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for purposes of illustration only, and are not intended to define the limits of the invention.

Figure 2:
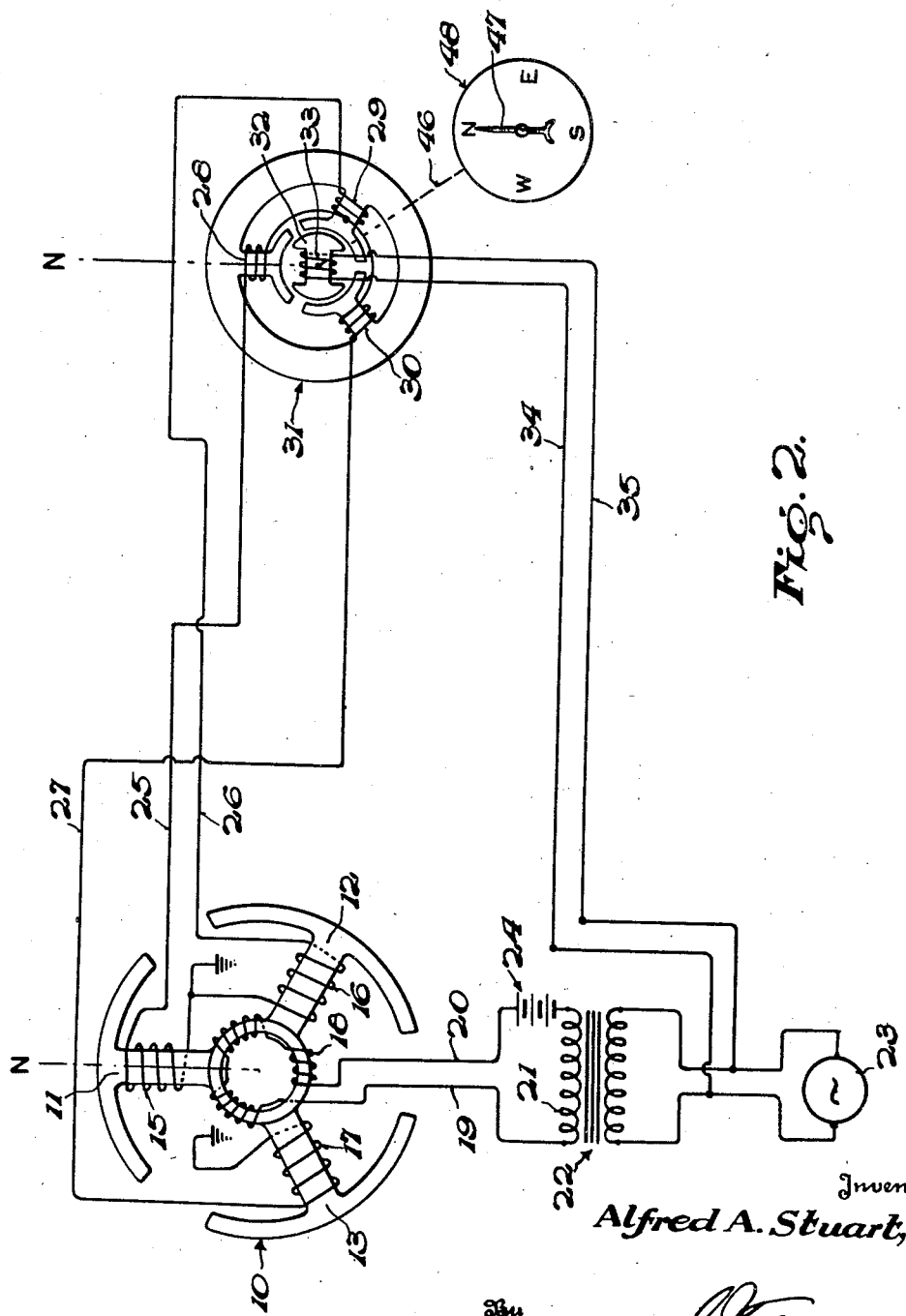

In the drawings, wherein like reference characters refer to like parts in the two embodiments;

Figure 1 is a partly schematic representation of the subject matter of the present invention; and, Figure 2 is a view similar to that of Figure 1 with the torque amplifier eliminated.

Referring now to the drawings and more particularly to Figure 1 thereof, the present invention is there shown as comprising a relatively stationary and nonrotatable magnetic pick-up device 10 of highly permeable material, such as "Permalloy" or "Mumetal," having legs 11, 12 and 13, symmetrically disposed 120 degrees apart and converging upon a central ring portion, or stationary armature 14, of the same material. The legs 11, 12 and 13 have windings 15, 16 and 17, respectively, wound thereon, and the central portion has an exciting winding 18 which may be split up as shown, into three equal portions for the purposes of symmetry.

Where in the aforementioned copending application, winding 18 was connected for energization directly with the alternating current source, now, and in accordance with the novel feature of the present invention, winding 18 is connected through leads 19 and 20 with the secondary 21 of a transformer 22, the primary of which connects with a suitable source of alternating current 23, a battery 24 being interposed between lead 20 and the secondary of the transformer so that winding 18 is fed with an undulating or varying unidirectional current for a purpose to presently appear.

Windings 15, 16 and 17 have their inner ends connected to ground, and their outer ends 25, 26 and 27, respectively, are connected to stator windings 28, 29 and 30 of a coupling inductive device 31 having inductively coupled therewith an angularly movable rotor 32 provided with a winding 33 thereon which is connected by way of leads 34 and 35 to the input of a conventional vacuum tube amplifier 36. The output of the amplifier may be connected through leads 37 and 38 to one phase 39 of a two phase induction motor 40, the second phase 41 of which is connected directly to source 23 by means of leads 42 and 43 for energization thereby. Since the phase of the current energizing the variable phase of the motor must be displaced substantially 90° from the phase of the current energizing the fixed motor phase, a suitable and conventional condenser (not shown) for attaining this end may be arranged within amplifier 36.

Rotor 44 of motor 40 is geared to rotor 32 through any suitable gear train 45 connected with a shaft 46, which at its free end has a pointer 47 rotatable therewith for indicating direction upon the compass card of an azimuth scale 48. Amplifier 36, induction motor 40, gear train 45, etc., constitute a torque amplifier expedient for amplifying the signal induced in rotor winding 33 of the inductive device.

As pointed out in greater detail in the copending application, any relative displacement of inductor element 10 to the earth's field will manifest itself in variable signals generated within secondary windings 15, 16 and 17 which are communicated to stator windings 28, 29 and 30 of device 31 where the resultant of the magnetic field at the coupling device will be displaced angularly, inducing a signal within rotor winding 33. This signal is amplified by virtue of amplifier 36 and fed to energize phase 39 of motor 40 whereupon the motor drives rotor 32 toward a null position, i. e., a position wherein the winding 33 assumes a position normal to the resultant magnetic field produced by the stator windings whereupon the signal within the winding drops to zero and the motor is de-energized. Simultaneously with the movement of rotor 32 toward its null position pointer 47 has been moved to indicate the amount of relative displacement between inductor element 10 and the earth's field.

For a better understanding of the present invention, it may be assumed that the relatively stationary inductor element 10 is disposed in the earth's magnetic field in a horizontal plane and leg 11 arranged in the direction of the north pole as shown in Figure 1, with no exciting current in winding 18, the earth's field will thread through leg 11 and equally through legs 12 and 13 and through armature 14. So long as the flux in legs 11, 12 and 13 is in a steady state, no voltage will be induced in windings 15, 16 and 17. However, as soon as an undulating or a varying unidirectional current is supplied to winding 18 by transformer 22 and battery 24, armature 14 is saturated periodically, or once per cycle of the current at source 23, whereby the earth's flux will decrease in legs 11, 12 and 13 at a rate depending upon the frequency of source 23. A voltage will be induced in each of windings 15, 16 and 17, setting up therein, as well as in each of stator windings 28, 29 and 30 of coupling device 31 alternating currents having the same frequency as the fundamental frequency of source 23. Windings 15, 16 and 17 are so arranged on legs 11, 12 and 13 that no voltages are induced therein due to the saturation of armature 14. The magnetic field caused by the saturation of the armature flows only through portion 14 and does not enter legs 11, 12 and 13. However, in saturating the armature portion, the reluctance of the path taken by the earth's field in legs 11, 12 and 13, prior to saturation will become relatively high, forcing the earth's field to decrease in armature 14 and legs 11, 12 and 13, and partially flow through a path of lower reluctance in the air.

While the torque amplifier described above is of decided advantage for certain uses of the system of the present invention, there is shown in Figure 2 an arrangement which does not require a torque amplifier but which is otherwise identical to the arrangement of Figure 1. Rotor winding 33 is connected directly to source 23 by way of leads 34 and 35. The alternating currents communicated from windings 15, 16 and 17 to stator windings 28, 29 and 30, and having the same frequency as the fundamental of source 23, will set up a resultant magnetic field at the rotor of inductive device 31 and the current in winding 33 due to source 23 will set up a field so that rotor 32 will be displaced angularly in the stator field until the field of winding 33 is aligned with the resultant field of the stator windings. This position will be that at which the maximum number of lines of force are passing through winding 33. Angular motion on the part of rotor 32 is reproduced by pointer 47, the latter being movably connected to the rotor.

It will now become apparent to those skilled in the art that a novel system has been provided by the present invention wherein by energizing the primary winding of the inductor element with an undulating or varying unidirectional current, greater excitation frequencies may be utilized thus increasing substantially and desirably the power output at the secondary windings of the inductor element. Moreover, by the novel provision described, the system has not only been improved but simplified as well to the extent that where previously similar systems required frequency doublers, such provision is no longer needed and has been eliminated.

Although the system has been illustrated as an earth inductor type of compass wherein the inductor element is disposed in the earth's magnetic field, it can be applied equally as well for detecting small magnetic fields resulting from means other than the earth's field.

When the system is designed to act as a compass and, in accordance with the present invention, an undulating or varying unidirectional current is used for excitation, it may be desirable, in order to avoid the possibility of leakage flux setting up a local field and introducing an error into the system, to provide an additional ring or armature, similar to armature 10, and provide each armature with a primary winding thereon, the primaries being arranged in series opposed relation so that the energizing currents will flow in opposite directions, thus magnetizing both armatures in opposite directions. In addition to having a common primary the two armatures would be fastened together. By virtue of such provision, no resultant leakage would occur and errors otherwise due thereto would be eliminated from the system.

Although two embodiments of the invention have been illustrated and described, various changes and modifications in the form and relative arrangement of the parts, which will now appear to those skilled in the art, may be made without departing from the scope of the invention. Reference is therefore to be had to the appended claims for a definition of the limits of the invention.

I claim:

1. In combination, controlling means comprising an inductive device having a stator winding and a rotor winding, one of said windings being polyphase and the other being single phase, a two phase alternating current motor connected to angularly displace the rotor winding of said inductive device and having a winding in each phase, a source of alternating current connected to energize the winding of one phase of said motor, a magnetic induction device comprising a relatively stationary core of permeable magnetic material adapted to be traversed by a magnetic flux from an external magnetic field and having a polyphase winding and an energizing winding thereon, means connected to said energizing winding and interposed between said alternating current source and said induction device to supply said energizing winding with an undulating unidirectional current to vary the reluctance of said core whereby an alternating current having the same frequency as the frequency of the alternating current from said source is generated in the polyphase winding of said core member by the magnetic flux traversing said core member, means connecting the polyphase winding of said induction device to the polyphase winding of said inductive device, and means connecting the single phase winding of said inductive device to energize the winding of the other phase of said motor whereby the latter operates to angularly displace the rotor winding of said inductive device upon relative angular movement between the core of said induction device and said external magnetic field.

2. An earth inductor compass comprising in combination with an exhibiting device, an electromagnetic device connected to said exhibiting device and comprising a rotor having a single phase winding and a stator having a multipolar winding, a two phase motor drivably connected to said rotor, an earth inductor device comprising a core of permeable material adapted to be traversed by the earth's magnetic field and having a multipolar winding thereon connected to the multipolar winding of said electromagnetic device and a single phase winding, a source of alternating current, and means connected with said source for deriving an undulating unidirectional current therefrom for energizing said single phase winding of said inductor device to vary the reluctance of said core whereby an alternating current having the same frequency as the frequency of the current of said source is generated in the multipolar winding of said inductor device by the magnetic field traversing said core, one phase of said motor being connected to said alternating current source and the other phase of said motor being connected to said rotor winding whereby angular displacement of said inductor device relative to said field produces an electromotive force in said rotor winding for energizing said motor.

3. An earth inductor compass comprising in combination with an exhibiting device, an electromagnetic device connected to said exhibiting device and comprising a rotor having a single phase winding and a stator having a multipolar winding, a two phase motor drivably connected to said rotor, an earth inductor device comprising a core of permeable material adapted to be traversed by the earth's magnetic field and having a multipolar winding thereon connected to the multipolar winding of said electromagnetic device and a single phase winding, a source of alternating current, and means comprising a transformer having a primary winding connected to said alternating current source and a secondary winding together with a source of direct current connected in series with said secondary winding for deriving an undulating unidirectional current from said alternating current source for energizing said single phase winding of said inductor device to vary the reluctance of said core whereby an alternating current having the same frequency as the frequency of the current of said source is generated in the multipolar winding of said inductor device by the magnetic field traversing said core, one phase of said motor being connected to said alternating current source and the other phase of said motor being connected to said rotor winding whereby angular displacement of said inductor device relative to said field produces an electromotive force in said rotor winding for energizing said motor.

4. In an apparatus of the character described, a permeable core member adapted to be traversed by a magnetic flux from an external magnetic field, a multipolar winding carried by said core member, a single phase exciting winding on said core member, a source of alternating current, and means interconnecting said exciting winding and said source of current for converting said alternating current into undulating unidirectional current and feeding said exciting winding with said unidirectional current to periodically vary the reluctance of said core member whereby an alternating current having the same frequency as the frequency of the current of said source is generated in the multipolar winding of said core member by the magnetic flux traversing said core member.

5. In an apparatus of the character described, a permeable core member adapted to be traversed by a magnetic flux from an external magnetic field, a multipolar winding carried by said core member, a single phase exciting winding on said core member, a source of alternating current, and means interconnecting said exciting winding and said source of current for converting said alternating current into undulating unidirectional current and feeding said exciting winding with said undulating current to periodically vary the reluctance of said core member whereby an alternating current having the same frequency as the frequency of the current of said source is generated in the multipolar winding of said core member by the magnetic flux traversing said core member, said converting means comprising a transformer having a primary connected to said alternating current source and a secondary connected to said exciting winding, and a source of direct current in circuit with said secondary.

6. An earth inductor compass comprising in combination with an indicator, a permeable core member adapted to be traversed by the earth's magnetic field, coil means on said core member, an exciting winding on said core member, an alternating current source, means connected to said exciting winding and to said current source for converting said alternating current into unidirectional undulating current and feeding said exciting winding with said undulating current to periodically vary the reluctance of said core member whereby an alternating current of a frequency equal to the frequency of the current of said source is generated in said coil means by the magnetic field traversing said core member, and an inductive device comprising a wound stator connected with said coil means and a wound rotor inductively coupled with said stator and connected to said alternating current source for operating said indicator.

7. In combination, controlling means comprising an inductive device having a multipolar stator winding and a rotor winding, an electromagnetic actuating device, means drivably connecting said actuating device to the rotor winding of said inductive device for angularly displacing said rotor winding, a source of alternating current, direction responsive means comprising an inductor device disposed in and traversed by the magnetic flux of a unidirectional magnetic field and including a stationary multipolar winding electrically connected to the multipolar winding of said inductive device and a stationary single phase winding, means connected with said source for deriving an undulating unidirectional current therefrom for energizing said single phase winding of said inductor device to vary the reluctance of said core whereby an alternating current having the same frequency as the frequency of the current of said source is generated in the multipolar windings of said inductor device by the magnetic field traversing said core, and means electrically connecting the rotor winding of said inductive device to said electromagnetic actuating device for energizing the latter.

8. An earth induction device comprising in combination, a permeable core member adapted to be traversed by the earth's magnetic field, coil means on said core member, an exciting winding on said core member, an alternating current source, means connected to said exciting winding and to said current source for converting said alternating current into undulating unidirectional current and feeding said exciting winding with said undulating current to periodically vary the reluctance of said core member whereby an alternating current of a frequency equal to the frequency of the current of said source is generated in said coil means by the magnetic field traversing said core member, and an inductive device comprising a wound stator connected with said coil means and a wound rotor inductively coupled with said stator and connected to said alternating current source.

ALFRED A. STUART, Jr.

REFERENCES CITED

The following references are of record in the file of this patent:

UNITED STATES PATENTS

| Number | Name | Date |
|---|---|---|
| 2,053,154 | La Pierre | Sept. 1, 1936 |